United States Patent [19]
Hovila

[11] 3,948,538
[45] Apr. 6, 1976

[54] SELF EQUALIZING BALL CASTER LIFT MAT

[76] Inventor: Harry Hovila, 17517 Clover Road, Bothell, Wash. 98011

[22] Filed: June 16, 1975

[21] Appl. No.: 587,245

[52] U.S. Cl. ............................. 280/43.23; 280/79.1
[51] Int. Cl.² ........................................ B62B 21/18
[58] Field of Search ............ 280/79.1, 43.23; 16/24, 16/25, 26, 32, 34

[56] References Cited
UNITED STATES PATENTS

| | | | |
|---|---|---|---|
| 171,367 | 12/1875 | Estes | 280/79.1 |
| 2,671,242 | 3/1954 | Lewis | 280/43.23 |
| 2,805,098 | 9/1957 | Robinson | 280/79.1 |
| 2,830,824 | 4/1958 | Young | 280/79.1 |
| 3,411,802 | 11/1968 | Diller | 280/79.1 |
| 3,420,541 | 1/1969 | Flurscheim | 280/43.23 |

*Primary Examiner*—Robert R. Song
*Attorney, Agent, or Firm*—Christensen, O'Connor, Garrison & Havelka

[57] ABSTRACT

The self equalizing ball caster lift mat of the present invention includes a load support sub-assembly and a caster sub-assembly interconnected by a pressure member. The load support sub-assembly is a flat plate adapted for insertion under a load and for bearing the weight of a load. The caster sub-assembly comprises an alignment plate having a plurality of transverse bores therethrough arranged in an array. A ball caster is mounted for reciprocating movement in each of the bores.

16 Claims, 6 Drawing Figures

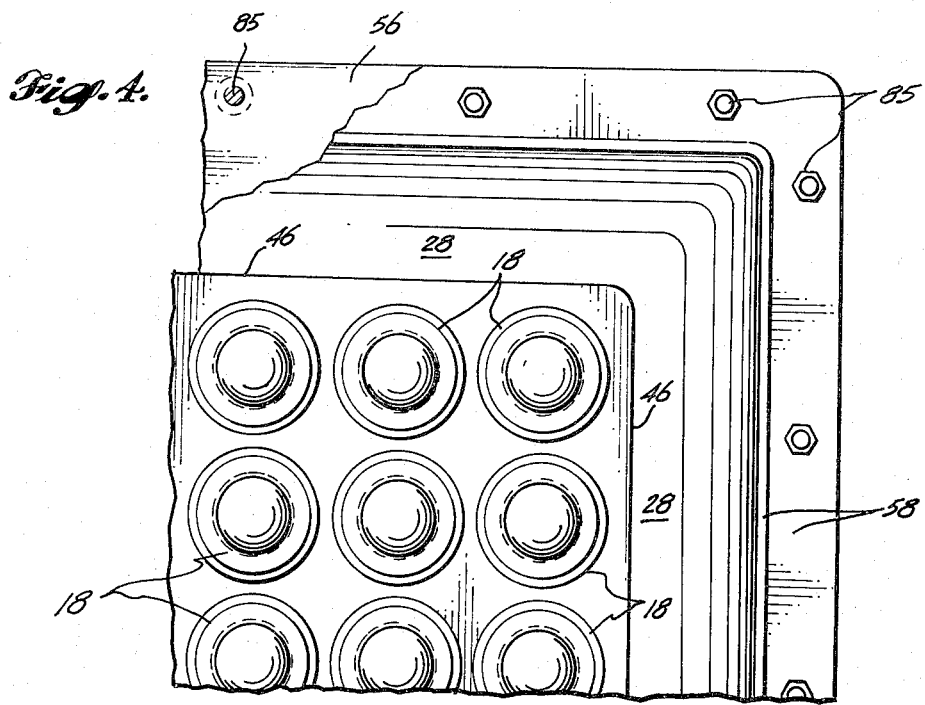
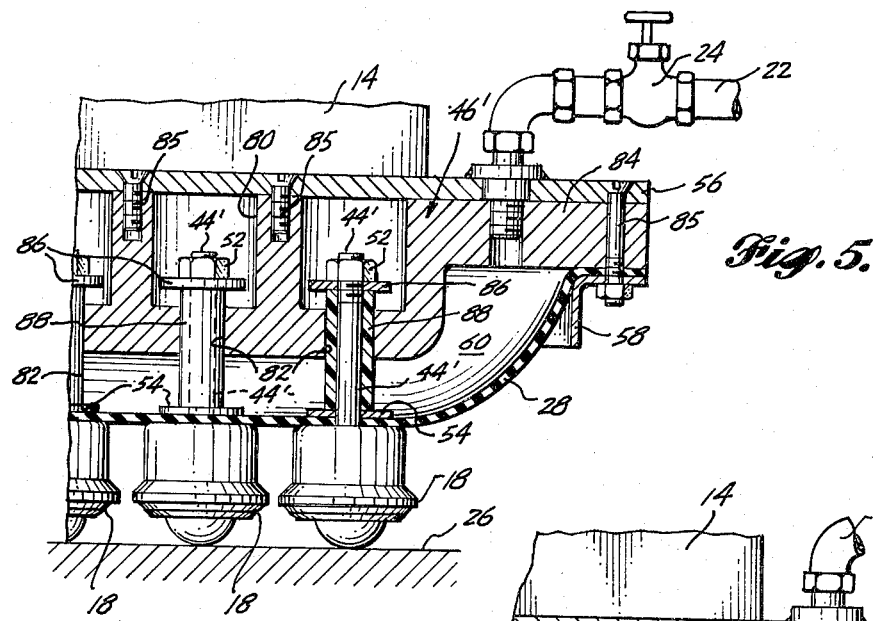
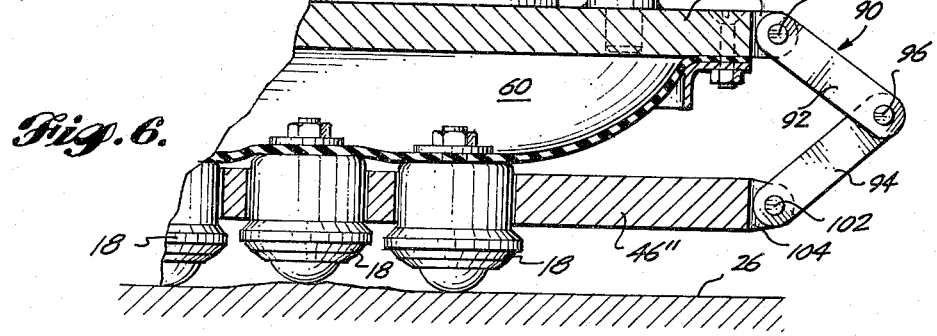

SELF EQUALIZING BALL CASTER LIFT MAT

BACKGROUND OF THE INVENTION

The present invention relates to an apparatus for supporting loads, for rolling lateral movement in all directions across and for rotation about a vertical axis on a supporting surface, and more particularly, to a caster assembly comprising a plurality of caster units mounted in a spaced array.

Many temporary load supporting and traverse units are currently available. One such unit is known as a roller skid and comprises a frame having a plurality of cylindrically shaped rollers mounted for rotation thereon. In use, the load is elevated by means not associated with the roller skids. Three or more of the roller skids are then placed under the load at predetermined locations so that the load is evenly distributed to each of the roller skids. The load is then lowered onto the skids for traverse. In their simplest form, skids are satisfactory for movement of a load in a relatively straight line. However, when the load must be turned, the load must again be re-elevated, the roller skids turned so as to be aligned in the desired traverse direction, and the load again lowered onto the skids. Turntables are provided for interposition between the roller skids and the load so that the roller skids can be manually turned relative to the load for movement in an alternate direction. With such transportation devices, it is very difficult to turn the load itself relative to the first direction of traverse.

Other transport devices are available that do provide the desired ability to turn the load itself rather than to merely change the direction of traverse. Such devices include pressurized air cushion support devices and the like. For certain applications such devices are more than adequate. However, for movement of relatively small loads on the order of one to five tons, the capital investment required for such devices become prohibitive. These devices also require a continuous supply of pressurized fluid at a substantial flow rate and a sealed and extremely smooth surface upon which to operate efficiently.

It is therefore an object of the present invention to provide a load support and traverse assembly that is relatively inexpensive to manufacture, that can support substantial loads, that has the capability to lift and hold a load from the floor without the use of external or auxiliary load lifting means, and that can be used to move a support load in any given direction as well as to orient the load for traverse in an infinite number of directions without lowering and reelevating the load and without the use of turntables or the like.

Further objects of the present invention are to provide a load supporting caster assembly including a multiple array of caster units, each of which support a distributive share of a given load without horizontal prealignment; to provide such an assembly with the capability of equally loading caster units as they traverse an irregular surface so as to prevent overloading of any individual caster; and to provide such an assembly with a resilient mounting so as to cushion the supported load from shocks that it might otherwise receive as it is being transported over irregularities in a supporting surface.

SUMMARY OF THE INVENTION

In accordance with the foregoing objects, and other objects that will become apparent to one of ordinary skill upon reading the following specification, the present invention provides an apparatus for supporting a load for traverse across a generally planar supporting surface. The apparatus comprises a load supporting frame member, a pressure member associated with the frame member and a plurality of roller means affixed to and supported by the pressure member. The pressure member can comprise a flexible, fluid impervious member and means for attaching the flexible member to the load supporting frame so as to form a fluid chamber between the flexible member and the load supporting frame. A plurality of roller means, such as ball casters, are affixed in a predetermined array to the central portion of the flexible member. An alignment means holds the roller means in the spaced array and prevents them from individually angulating relative to each other and relative to the load supporting frame member, while mounting them for reciprocating movement relative to each other. When a fluid under pressure is admitted to the fluid chamber, the load supporting frame is elevated relative to the roller means and the alignment means, thus providing the capability to lift a load supported by the load supporting frame relative to the supporting surface on which the roller means rest. The load supported by the load supporting surface can then be traversed across the supporting surface. As the roller means encounter surface irregularities, they can reciprocate relative to one another to conform. The vertical position of the individual roller means in the array conform to the shape of the supporting surface at a given location while each of the roller means continues to support its distributive share of the load transmitted from the load supporting frame member through the pressure chamber and the flexible member.

BRIEF DESCRIPTION OF THE DRAWINGS

A better understanding of the present invention can be derived by reading the ensuing specification in conjunction with the accompanying drawings wherein:

FIG. 4 is a bottom view of the portion of the assembly shown in FIGS. 2 and 3;

FIG. 5 is a side elevation view in partial cross section of a portion of an alternate embodiment of the lift mat of the present invention; and FIG. 6 is a side elevation view in partial cross section of a portion of another embodiment of the lift mat of the present invention.

DESCRIPTION OF PREFERRED EMBODIMENT

Figure 1:
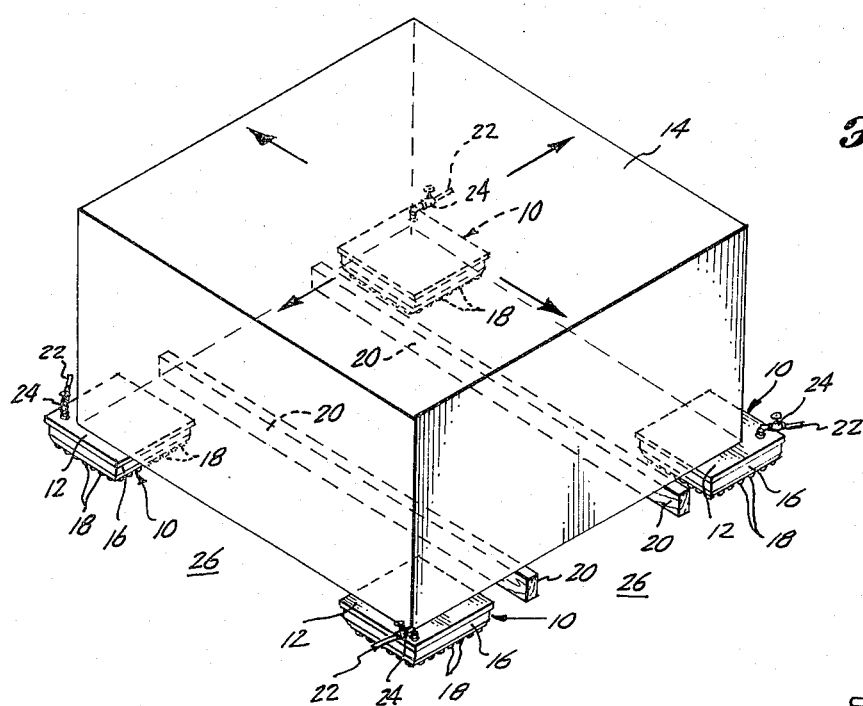
FIG. 1 is an isometric view of a representative load unit supported by a plurality of the self equalizing ball caster lift mats of the present invention.

Referring to FIG. 1, heavy objects 14 such as crates or units of machinery are typically stored so that they are elevated from the floor or other surface 26 by static supports 20, such as beams or a pallet. The self equalizing lift mat of the present invention is a dual function device, providing a means for initially lifting the object or load 14 from its static supports, and, when elevated, providing a means for supporting and laterally transporting the load along the supporting surface 26. Each caster assembly 10 is comprised of a load support subassembly 12 and a caster sub-assembly 16. The load support sub-assembly provides a physical platform upon which the load rests. The caster sub-assembly 16, comprised of a spaced array of ball caster units 18, permits the load to be rolled laterally across the supporting surface. The load support and caster sub-assemblies are interconnected by an expansible, fluid tight bladder member (not visible in FIG. 1) that can be internally pressurized with a fluid to elevate the load support sub-assembly and the load thereon relative to the caster sub-assembly, thereby lifting the load from its static supports 20.

Figure 2:
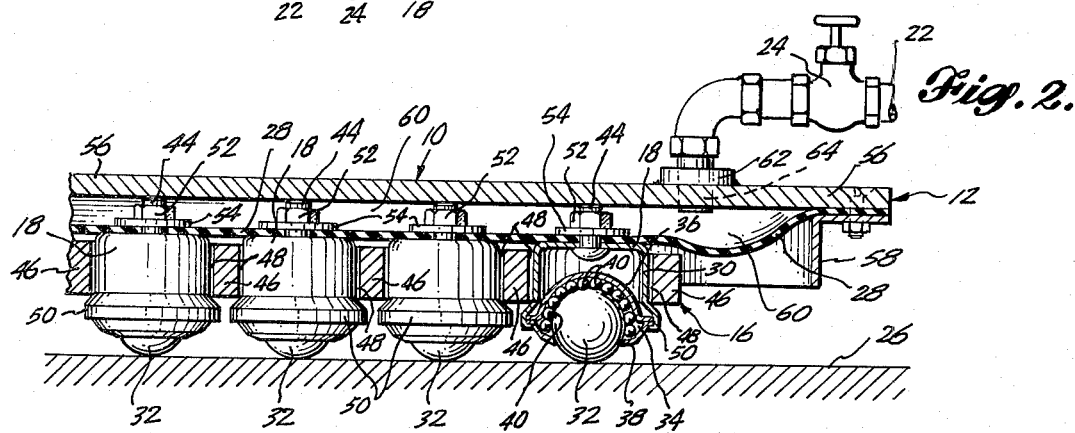
FIG. 2 is a side elevation view in partial cross-section showing a portion of a lift mat in the quiescent or unloaded state.

FIG. 2 illustrates the load support and caster subassemblies 12 and 16 of the lift mat 10 and the manner in which they are interconnected by the bladder member 28. In the preferred embodiment illustrated in FIGS. 2, 3 and 4, a commercially available ball caster unit 18 of the type commonly employed in conveying devices is employed as a rolling member, although other rolling members, such as conventional, swivel-type casters could be employed. The ball caster unit 18 is comprised of a cup-like housing 30 carrying a hardened steel caster ball 32. The housing of the preferred ball caster has a cylindrically-shaped side wall, integral top wall and an open bottom and is generally vertically oriented. The ball, commonly one to several inches in diameter, is held loosely captive within a cavity 34 formed within a hemispherical race 36 within the housing. A ball cleaning collar 38 is affixed to, and encompasses the lower periphery of the housing. A hemispherical layer of ball bearings 40 is held loosely captive between the caster ball 32 and the race 36. The ball bearings 40 are held in the race 36 by the ball cleaning collar. The ball race 36 and collar 38 are fixed relative to one another by their respective peripheral flanges, which are clamped to the housing 30 and thus are effectively integral to the housing. A threaded stove bolt 44 is secured to the housing and protrudes upwardly through a square hole in the top wall of the housing and is aligned with the generally vertically oriented axis of the cylindrically-shaped housing.

The caster units 18 are held in a spaced array by a retainer plate 46, which approximates a square in the preferred embodiment. A plurality of evenly spaced bores 48 are drilled vertically through the plate. Each bore has a diameter slightly larger than the outside diameter of the cylindrical side wall of the caster housing 30. The casters 18 are installed in the bores 48 of the retainer plate 46 so they reside in a generally vertical orientation. The casters are thus mounted for reciprocating movement relative to the plate in a direction generally transverse, and preferably vertically, relative to the floor 26. Annular, outwardly flared shoulders 50, formed on the bottom portions of the side walls of the caster housings 30 limit the upward penetration of the casters into the bores 48 of the retainer plate 46.

A diaphragm 28, constructed from a flexible, reinforced, fluid impervious fabric, for example, a natural or synthetic polymer impregnated nylon fabric, loosely overlies the upper surface of the retainer plate. The diaphragm is provided with an array of apertures through which the upwardly extending caster unit mounting bolts 44 protrude. The bolts of the respective caster units are secured to the diaphragm by threaded hex nuts 52 tightened down onto washers 54 overlying the diaphragm. Compression of the portion of the diaphragm located between the upper surface of the top walls of the caster housings 30 and the washers 54 forms an airtight seal and effectively reinforces the fabric around the through hole. The caster units 18 are thus held captive within the bores 48 in the retainer plate 46. Each caster unit can independently translate or reciprocate vertically within its respective bore, its translatory throw being limited to the difference between the thickness of the retainer plate and the distance between the bottom surface of the bladder and the annular flared portion 50 on the caster housing 30. As hereinafter described in more detail, the vertical translation of the casters within the bores 18 in the retainer plate permits each caster unit to independently compensate for rises or depressions in the supporting surface 26 over which they pass.

In this embodiment the caster sub-assembly and the retainer plate 46 are coupled to the load support sub-assembly 12 via the diaphragm 28 which carries the caster units and the retainer plate 46. The periphery of the diaphragm 28, perforated with evenly spaced bolt holes, is secured between the bottom surface of the load support plate 56 and a retaining flange 58 that extends around the periphery of the diaphragm 28. When the diaphragm material is compressed between the plate and the flange, a fluid tight seal is formed. The diaphragm is sized so that its central portion can flex in a direction transverse to its length and width and transverse to the supporting surface. A fluid chamber 60 is defined between the bottom surface of the load plate 56 and the upper surface of the diaphragm. A threaded boss 62 associated with a through hole 64 in the load support plate 56 provides a coupling location for a pressure line 22 through which a fluid may be injected into the fluid chamber 60. When the chamber is pressurized the diaphragm can distend, translating the load support plate and casters away from each other, and effectively elevating the load support plate 56 and the load carried thereon relative to the caster sub-assembly 16. The control valve 24 in the fluid input/exhaust line 22, though shown as a manual type in FIGS. 2 and 3, may be of a remotely operated type to permit synchronous adjustment of pressure with other caster assemblies supporting a common load.

FIG. 2 illustrates the lift mat 10 in a quiescent state in which the assembly resting on a floor or otherwise paved supporting surface 26 bears no load. The valve 24 in the input/exhaust line 22, in this case, is closed with essentially zero differential pressure between the fluid chamber 60 and the atmosphere. The retainer plate 46, while supporting the individual caster units 18 within the oversized bores 48 in the plate, rests collectively of its own weight on the annular flared shoulders 50 of the housings 30 of all of the caster units. The diaphragm 28 is loosely elevated from the retainer plate 46. The weight of the load support sub-assembly 12 bears on the upper ends of the bolts 44 that attach the bladder 28 to the caster units, transmitting the weight of the load support plate 56 and clamping collar 58 through the casters to the supporting surface 26.

Figure 3:
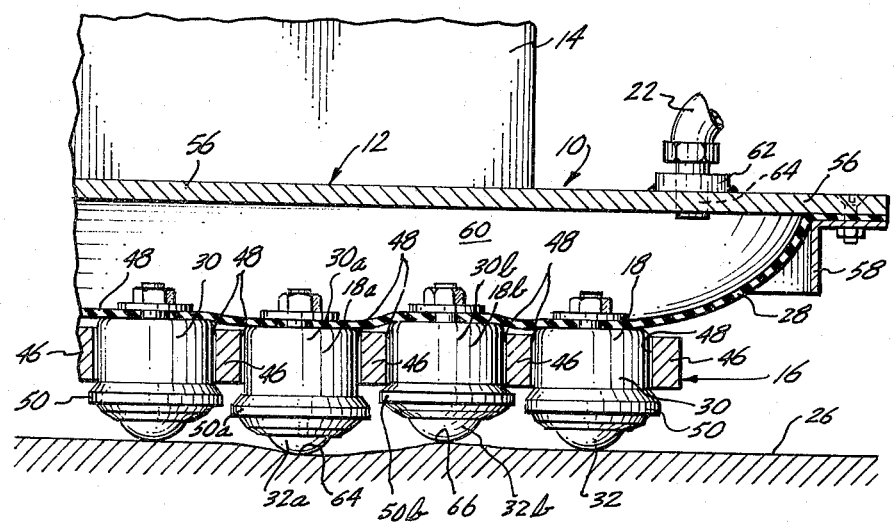
FIG. 3 is a similar to FIG. 2 except that the internal fluid chamber of the device is pressurized to expand the chamber and elevate a load for lateral transport.

In use the lift mat 10 require no prealignment before being deployed in the unpressurized state (FIG. 2) beneath a load 14 as shown in FIG. 1. The fluid pressure control valve 24 is then opened to admit fluid, for example air under pressure, to the fluid chamber 60. As shown in FIG. 3, pressurization of the fluid chamber 60 distends the diaphragm to elevate the load support plate 56 relative to the caster unit sub-assembly and relative to the supporting surface, causing the upper surface of the load support plate to engage the underside of the load 14. As the pressure in the chamber 60 is increased the load support plate 56 continues to elevate, transferring the weight of the load 14 from its static supports 20 to the caster assembly. The weight of the load is transmitted from the load support plate, through the high pressure fluid confined in the chamber 60, to the caster units 18 and, hence, to the supporting surface 26.

In the pressurized mode as in the quiescent mode, the retainer plate 46 rests collectively on the annular flared shoulders 50 of the caster housings 30 of all of the caster units in the array. The retainer plate functions to contain and vertically orient the individual castor units, thereby maintaining them in the spaced geometric array. It is particularly important relative to the invention to reiterate that no prealignment of the assembly 10 is required to compensate for deviations in the supporting surface since the individual castor units 18 are independently suspended by the diaphragm 28 within the retainer plate 46, allowing them to individually and independently vertically translate within the respective bores 48 in the plate.

As can be seen in FIG. 3, when an individual caster ball 32a rolls into a depression 64 in the supporting surface 26, the caster unit 18a will be forced downwardly by the pressurized air in the fluid chamber 60 bearing against the diaphragm 28, forcing the caster unit 18a to translate downwardly within the bore 48 into the depression. Because the fluid in the chamber 60 equally distributes the load forces to all the caster units, the caster unit 18a will continue to support its proportionate share of the load. Each individual castor will bear its load into a depression of a depth equal to the vertical distance between the connection point of the bladder 28 to the upper surface of the caster and the upper side of the annular flared shoulder on the caster minus the thickness of the retainer plate 46. Thus the assembly can effectively bridge most depressions normally encountered in the supporting surface during traverse. If the caster encounters a depression beyond its translation depth, the caster ball 32a will become suspended in the deeper depression and loose contact with the surface. Its load will then be distributively borne by adjacent caster units in the array. As the assembly continues to move laterally and the depth of the depression is reduced relative to the caster unit 18a, the caster ball 32a will again contact the supporting surface 26 and assume its distributive share of the load. Even if a given caster unit looses contact with the supporting surface, no adverse result occurs as the load normally carried by the caster is distributed equally to all the other caster units through the fluid pressure in the chamber and bladder.

Elevated portions of the supporting surface can also be transversed by the individual air pressurized suspension of the caster units without relieving the load on any given caster unit. Still referring to FIG. 3, a caster ball 32b resting on a raised portion 66 of the supporting surface 26 will be forced upwardly in its respective bore 48 in the retainer plate 46 relative to adjacent caster units. The upper surface of its housing 30b presses against the diaphragm 28 and into the cushion of air in the fluid chamber 60, thereby continuing to bear its share of the load. The retainer plate 46, which normally rests of its own weight on the annular flared shoulder 50b of the caster housing 30, is slightly elevated relative to the surrounding casters as the caster unit 18b is forced upwardly by the elevated portion 66 in the supporting surface 26. Elevation of the retainer plate does not affect the operation of the remaining caster units as they are forced downwardly relative to the retainer plate by the fluid pressure bearing against the diaphragm 28. As the caster assembly continues its traversing movement across the supporting surface, the caster ball 32b will return to the mean level of the supporting surface 26 by coaction of the fluid pressure on the diaphragm 28 against the caster housing 30b. As the caster unit 18b returns to its normal level, the retainer plate 46 will follow the flared shoulder 50b and return to its normal attitude.

It can be seen that, as the caster assembly with its fluid chamber 60 pressurized is laterally traversed across a supporting surface under the weight of a load 14, the individual caster units of the assembly will physically translate in a direction transverse to the supporting surface, i.e., in a vertical direction, to adjust to surface level variations and will simultaneously adjust the load distribution equally to all the caster units in the array. Thus, the self equalizing ball caster lift mat will be relatively unaffected by the surface level variations as the individually suspended castor units automatically compensates for such variations. The automatic load equalizing ability of the present invention coupled with simultaneous distribution of the load solves the problems inherent in prior art devices and fulfills the objects of the invention set forth above.

An alternate embodiment of the present invention, illustrated in FIG. 5, is functionally identical to the preferred embodiment. Like numerals are employed in this figure for similar or identical components to those described in conjunction with the first embodiment. In this embodiment, the retainer or guide plate 46' is interposed between the upper support plate 56 and the diaphragm 28 and is affixed to the bottom surface of the support plate. The retainer plate contains a plurality of relatively large bores 80 extending partially through the plate from the upper surface. The axis of the bores 80 is oriented perpendicularly to the upper, load supporting surface of the support plate. Each of the large bores communicates with the bottom side of the retainer plate through a concentrically aligned smaller bore 82. A sidewardly extending peripheral flange 84 is formed integrally with the retainer plate 46' and serves as an attachment flange between the support plate 56 and the retainer plate 46'. A plurality of threaded fasteners 84 affix the support plate to this attachment flange.

The diaphragm 28 is affixed to the bottom surface of the peripheral flanges 84 on the retainer plate 46' with L-shaped clamping collars 58 similar to those employed in the first embodiment. The ball castors 18 are affixed to the diaphragm at locations aligned with the small bores 82 in the guide plate 46'. The stud 44' is longer than that employed with the caster units 18 in the first embodiment. The stud 44' is sized to extend through the small bores 82 into the large bores 80. A washer 54, inserted over the stud 44' rests on the top surface of the diaphragm 28. A cylindrical antifriction sleeve 88, composed of, for example polytetrafluoroethylene, having an outer diameter sized to reciprocate within the small bores 82 is positioned over the stud and bears against the top surface of the washer 54. A second washer 86 is positioned on the bolt over the sleeve 88 and a threaded retaining nut 52 is secured onto the top surface of the second washer 86, securly fastening the castor unit 18 to the diaphragm. The washers 54 and 86 have an outer diameter greater than the outer diameter of the sleeve and the diameter of the small bores 82. The lower washer 54 serves as a stop against the bottom surface of the retention plate 46' to limit the upward travel of the caster unit. The upper washer 86 serves as a stop against the bottom end wall of the larger bore 80 to limit the downward travel of the caster unit. In this manner, each of the individual casters 18 are mounted for relative reciprocating movement in the bores in a direction transverse to the upper load supporting surface of the load support plate 56. A fluid pressure coupling, including hose 22 and valve 24, is provided in the support plate for admitting fluid pressure to and relieving fluid pressure from the chamber 60 formed between the upper surface of the diaphragm 28 and the lower surface of the retention plate 46'.

In operation, the alternate embodiment of the self equalizing lift mat shown in FIG. 5 is much the same as the preferred embodiment described above. However, in this embodiment since the retention plate 46' is affixed to the load support plate 56, neither the casters nor the retention plate can translate relative to the upper load supporting surface of the load support plate as can occur with the first embodiment described.

Referring to FIG. 6, a second alternate embodiment is very similar in construction to the first embodiment described above. However, a scissors linkage interconnects the retainer plate and alignment plate 46'' with the upper load support plate 56. Although, only a single scissors linkage 90 is illustrated in FIG. 6, it is to be understood that at least one scissors linkage can be employed on each of the four sides of the caster assembly. The scissors linkage can be of the two bar linkage type employing an upper bar 92 and a lower bar 94, which are pivotally interconnected by a pin 96 at respective adjoining ends. The opposite end of the bar 92 is pivotally connected via pin 98 to a yoke 100 extending outwardly from the edge of the upper load supporting plate 56. Likewise, the lower end of the lower bar 94 is pivotally interconnected by a pin 102 to a yoke 104 extending outwardly from the side edge of the retention and alignment plate 46''. The diaphragm and the caster units are coupled to the upper load support plate 56 in a manner identical to the first embodiment.

In use, this embodiment functions identically to the one first described. The scissors linkage 90 serves to restrain relative lateral or horizontal movement between the retention plate 46'' and the load support plate 56 as well as to guide the relative bidirectional movements of these two members in a vertical or transverse direction.

The embodiments of this invention heretofore described are basic configurations of the caster assembly. Variation of the number of caster units and their relative distribution and spacing under a load are design considerations when determining load carrying capacity of an individual assembly. The size of the assembly may be increased and more caster units employed for distributively supporting larger loads, or may be decreased for supporting smaller loads. Additionally, the number of assemblies employed to support a load may be increased from three or four to as many as required to provide more selective load distribution. The pattern in which the caster assemblies are deployed may also be varied to permit stable support for even the most awkward load configurations. The load support plate, that element of the assembly upon which the load rests may be contoured or sculptured or equipped with brackets and/or fasteners on its upper surface to receive and mate the shape of a repetitive-type load configuration. Additionally, each assembly can be equipped with attachments for handling and towing, ranging from simple hand grips to detachable T-handle tow bars. The assemblies may also be equipped with fittings and appliances for mating with fork lift lifting members to substantially increase fork lift capacity without overloading the lift. As noted earlier, the fluid input/exhaust lines of all the assemblies employed with a given load can be tied to a single remote pressure control device offering individual or synchronous jacking control of the asemblies under the load. Other variations, modifications, substitutions or equivalents in addition to the foregoing can be effected by one of ordinary skill in the art after reading the foregoing specification. It is therefore intended that the protection afforded by patent to the invention as disclosed above be limited only by the definition contained in the appended claims.

What is claimed is:

1. An apparatus for supporting a load for traverse across a generally planar supporting surface comprising:

a frame member having an upper portion and a lower portion, said frame member including a supporting surface on the upper portion thereof for contacting the underside of a load to be supported, said frame member including a bottom portion, a flexible, fluid impervious member and attachment means for attaching said flexible member to the bottom portion of said frame member, said flexible member and said frame member being so constructed so as to form a fluid chamber and to present a surface portion of said flexible member spaced from and in a generally parallel relationship to said supporting surface, a plurality of roller means, each of said roller means having a body and roller member for contacting and rolling over said supporting surface, said roller member being mounted on said body for rolling movement, retention means associated with said plurality of roller means for mounting and orienting said roller means for independent, relative movement toward and away from said frame member in a direction transverse to said supporting surface, the body of each of said roller means coacting with said surface portion of said flexible member so that fluid pressure present in said chamber is transmitted to said roller means to bias the movement of said roller means away from said frame member.

2. The apparatus of claim 1 further comprising means associated with said fluid chamber for admitting a fluid to and exhausting a fluid from said fluid chamber.

3. The apparatus of claim 2 wherein said flexible member comprises:

a flexible, substantially inelastic diaphragm having a periphery and a central portion, said attachment means affixing the periphery of said diaphragm to said frame member so as to allow the central portion of said diaphragm to flex and move relative to said frame member.

4. The apparatus of claim 3 wherein each of said roller members being affixed to the central portion of said diaphragm.

5. The apparatus of claim 4 wherein said roller members comprise ball casters.

6. The apparatus of claim 1 wherein said roller members are affixed at predetermined spaced locations to said surface portion of said flexible member.

7. The apparatus of claim 5 wherein each of said ball casters further comprises an attachment bolt affixed to the body portion thereof, said bolt extending through an aperture in said flexible member, and a fastening member engaging said bolt to secure said diaphragm between said nut and the body of said caster.

8. The apparatus of claim 1 wherein
said retention means comprises a plate having a plurality of bores therethrough, said plate being oriented in generally parallel relationship to the supporting surface of said frame member, said bores being oriented generally perpendicularly to said surface, and wherein
each of said roller means includes a cylindrically shaped portion mounted for reciprocating movement in one of said bores.

9. The apparatus of claim 8 wherein said plate is affixed to said frame member.

10. The apparatus of claim 8 wherein
said plate is positioned between said flexible member and said supporting surface, and wherein
each of said roller means have retaining means thereon for affixing said roller means to said flexible member.

11. The apparatus of claim 8 further comprising:
linkage means coupling said retention means to said frame member, said retention means thereby being mounted for movement relative to said frame member in a direction transverse to said supporting surface.

12. The apparatus of claim 11 wherein said linkage means comprises a pivotally interconnected two bar linkage, one bar of said linkage being pivotally attached to said retention means and the other bar of each linkage being pivotally attached to said frame member.

13. An apparatus for supporting a load for traverse across a supporting surface comprising:
frame means having an upper portion for carrying a load and a lower portion,
diaphragm means secured to the lower portion of said frame means, said diaphragm and the lower portion of said frame means co-defining an expansible fluid chamber capable of confining a compressible fluid, said diaphragm means having a generally planar, central portion that is moveable relative to the upper portion of said frame means to expand and contract said fluid chamber, said diaphragm means being flexible in a direction generally transverse to said generally planar central portion,
a plurality of roller means for supporting said frame means, said diaphragm means, and said load, each of said roller means including a body and a rolling member secured for rolling movement to said body,
retention means associated with said frame means and said diaphragm means for mounting said plurality of roller means for independent relative movement toward and away from said frame means in a direction generally parallel to the direction of movement of said central portion of said diaphragm means, said alignment means positioning the bodies of said plurality of roller means contiguous to the central portion of the diaphragm means so that, as the fluid pressure in said fluid chamber is increased, said diaphragm means bears upon the bodies of said roller means to bias the movement of said roller means relatively away from said frame means.

14. The apparatus of claim 13 wherein said diaphragm means is positioned between said retention means and said frame means.

15. The apparatus of claim 13 wherein said retention means is affixed to the upper portion of said frame means and positioned within said chamber between the upper portion of said frame means and said diaphragm means.

16. The apparatus of claim 13 wherein said roller means are each independently affixed to said diaphragm means.

* * * * *